US011179875B1

(12) United States Patent
Bhat et al.

(10) Patent No.: US 11,179,875 B1
(45) Date of Patent: Nov. 23, 2021

(54) MODULAR BLOW MOLD SYSTEM FOR BLOW MOLDING A CONTAINER

(71) Applicant: PepsiCo, Inc., Purchase, NY (US)

(72) Inventors: Advait Rasik Bhat, White Plains, NY (US); Stefano Giuliani, Brooklyn, NY (US); Maximiliano Rodriguez, Hillside, NJ (US); Ellie Vineyard, White Plains, NY (US)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 16/932,151

(22) Filed: Jul. 17, 2020

(51) Int. Cl.
*B29C 49/48* (2006.01)
*B33Y 80/00* (2015.01)
*B29C 33/38* (2006.01)
*B29C 49/56* (2006.01)
*B33Y 10/00* (2015.01)
*B29L 31/00* (2006.01)

(52) U.S. Cl.
CPC ...... *B29C 49/4823* (2013.01); *B29C 33/3842* (2013.01); *B29C 49/56* (2013.01); *B33Y 80/00* (2014.12); *B29C 2049/4828* (2013.01); *B29C 2049/4858* (2013.01); *B29C 2049/4897* (2013.01); *B29C 2049/566* (2013.01); *B29K 2849/00* (2013.01); *B29K 2905/00* (2013.01); *B29L 2031/7158* (2013.01); *B29L 2031/757* (2013.01); *B33Y 10/00* (2014.12)

(58) Field of Classification Search
CPC ........ B29C 2049/4897; B29C 33/3842; B29C 2049/4858; B29C 49/48; B33Y 80/00; B33Y 10/00; B33Y 70/00
See application file for complete search history.

(56) References Cited

U.S. PATENT DOCUMENTS

| 5,458,825 | A | * | 10/1995 | Grolman | ................ | B33Y 80/00 |
|---|---|---|---|---|---|---|
|  |  |  |  |  |  | 264/401 |
| 8,573,960 | B2 | * | 11/2013 | Moreno | .................. | B29C 49/48 |
|  |  |  |  |  |  | 425/182 |
| 2014/0106105 | A1 | * | 4/2014 | Albrecht | ............. | B29C 33/3857 |
|  |  |  |  |  |  | 428/36.92 |
| 2015/0037453 | A1 | * | 2/2015 | Albrecht | ............. | B29C 49/4289 |
|  |  |  |  |  |  | 425/526 |
| 2018/0142054 | A1 | * | 5/2018 | Langhorst | ............ | C09D 151/08 |

\* cited by examiner

*Primary Examiner* — Robert B Davis
(74) *Attorney, Agent, or Firm* — Sterne, Kessler, Goldstein & Fox P.L.L.C.

(57) ABSTRACT

A modular system for blow molding a container. The system may include a first portion, a second portion, and a third portion. The first portion and second portion may each include a shell, a mold removably coupled to the shell, and a top plate. The third portion may include a base and a base mold. The molds may be 3D printed. The molds together may define a blow mold cavity. The modular system may be used at lab scale, pilot scale, or full production scale. The molds may be durable and smooth enough for full production scale. Some embodiments are directed methods for making a modular system for blow molding a container.

23 Claims, 7 Drawing Sheets

MODULAR BLOW MOLD SYSTEM FOR BLOW MOLDING A CONTAINER

BACKGROUND

The present disclosure relates to blow systems for blow molding a container. More particularly, the embodiments relate to a modular system for blow molding a container and methods for making the same.

BRIEF SUMMARY

Some embodiments are directed to a modular system for blow molding a container comprising a first portion, a second portion, and a third portion. The first portion may comprise a first shell, a first mold removably coupled to the first shell, a first top plate removably coupled to the first shell, and a first filler material disposed in a volume defined by the first shell, the first mold, and the first top plate. The second portion may comprise a second shell, a second mold removably coupled to the second shell, a second top plate removably coupled to the second shell, and a second filler material disposed in a volume defined by the second shell, the second mold, and the second top plate. The first mold and second mold may be 3D printed. The third portion may comprise a base and a base mold. The base may be removably coupled to the first shell and the second shell. The first mold, second mold, and the base mold together may define a blow mold cavity when the first portion is coupled to the second portion.

In any of the various embodiments disclosed herein, the system further comprises a first cavity retainer removably coupled to the first shell, and a second cavity retainer removably coupled to the second shell.

In any of the various embodiments disclosed herein, each of the first mold, the second mold, and the base mold is 3D printed.

In any of the various embodiments disclosed herein, the first shell, the first top plate, the second shell, and the second top plate are made of CNC machined metal.

In any of the various embodiments disclosed herein, each of the first mold, the second mold, and the base mold is isotropic.

In any of the various embodiments disclosed herein, the filler material has an elastic modulus of at least 6300 MPa.

In any of the various embodiments disclosed herein, the first mold, the second mold, and the base mold are made of a polymer comprising cyanate ester.

In any of the various embodiments disclosed herein, the system further comprises at least one cooling channel within each of the first mold and the second mold.

In any of the various embodiments disclosed herein, the system further comprises a locking ring removably coupled to the first shell. In any of the various embodiments disclosed herein, the base is configured to releasably engage with the locking ring to secure the third portion.

In any of the various embodiments disclosed herein, the system further comprises a plurality of vertically aligned recesses configured to receive the locking ring such that the vertical position of the third portion may be adjusted.

In any of the various embodiments disclosed herein, the first shell, the first top plate, the second shell, and the second top plate are made of CNC machined metal.

Some embodiments are directed to an interchangeable mold for blow molding a container. The mold may comprise a first 3D printed mold portion, a second 3D printed mold portion, and a 3D printed base portion. The first 3D printed mold portion, the second 3D printed mold portion, and the 3D printed base mold portion together may define a blow mold cavity. The first 3D printed mold portion, the second 3D printed mold portion, and the 3D printed base portion may be isotropic. The first 3D printed mold portion, the second 3D printed mold portion, and the 3D printed base portion are configured to engage with a shell, the shell being compatible with a blow mold system to form blow-molded containers within the blow mold cavity.

In any of the various embodiments disclosed herein, the first filler portion comprises a first side configured to mate with a back of the first 3D printed mold portion and a second side configured to mate with an interior side of the shell. In any of the various embodiments discloses herein, the second filler portion comprises a first side configured to mate with a back of the second 3D printed mold portion and a second side configured to mate with the interior side of the shell.

In any of the various embodiments disclosed herein, the first 3D printed mold portion, the second 3D printed mold portion, and the 3D printed base mold portion are made of a polymer comprising cyanate ester.

In any of the various embodiments disclosed herein, the mold further comprises a first filler portion and a second filler portion. In any of the various embodiments disclosed herein, the first filler portion has a first side in contact with a back of the first 3D printed mold portion and a second side configured to contact an interior side of the shell and the second filler portion has a first side in contact with a back of the second 3D printed mold portion and a second side configured to contact the interior side of the shell.

In any of the various embodiments disclosed herein, the first filler material and the second filler material are both a plaster.

In any of the various embodiments disclosed herein, the first mold portion and the second mold portion each comprise cooling channels.

In any of the various embodiments disclosed herein, the mold further comprises a first cavity retainer and a second cavity retainer for securing the first filler portion and the second filler portion, respectively.

In any of the various embodiments disclosed herein, the mold further comprises a first cavity retainer and a second cavity retainer for securing the first filler portion and the second filler portion, respectively.

Some embodiments are directed to methods of making a modular blow mold system comprising 3D printing a first mold portion, a second mold portion, and a base portion; coupling the first mold portion to a first shell to form a first half, the first half comprising a first volume defined by the first mold portion and the first shell; coupling the second mold portion to a second shell to form a second half, the second half comprising a second volume defined by the second mold portion and the second shell; pouring a filler material in the first volume; pouring the filler material in the second volume; and cooling the filler material for form a solid filler.

In any of the various embodiments disclosed herein, the first mold portion, the second mold portion, and the base portion are made of a polymer comprising cyanate ester.

In any of the various embodiments disclosed herein, the filler material comprises a plaster.

In any of the various embodiments disclosed herein, the plaster is a liquid before the cooling.

In any of the various embodiments disclosed herein, the cooling comprises cooling the filler material at room temperature.

In any of the various embodiments disclosed herein, the 3D printing step comprises forming at least one channel in the first mold portion and the second mold portion.

In any of the various embodiments disclosed herein, the method further comprises coupling the first half and the second half to form a blow mold comprising a blow mold cavity defined by the first mold portion and the second mold portion.

DETAILED DESCRIPTION

Figure 1:
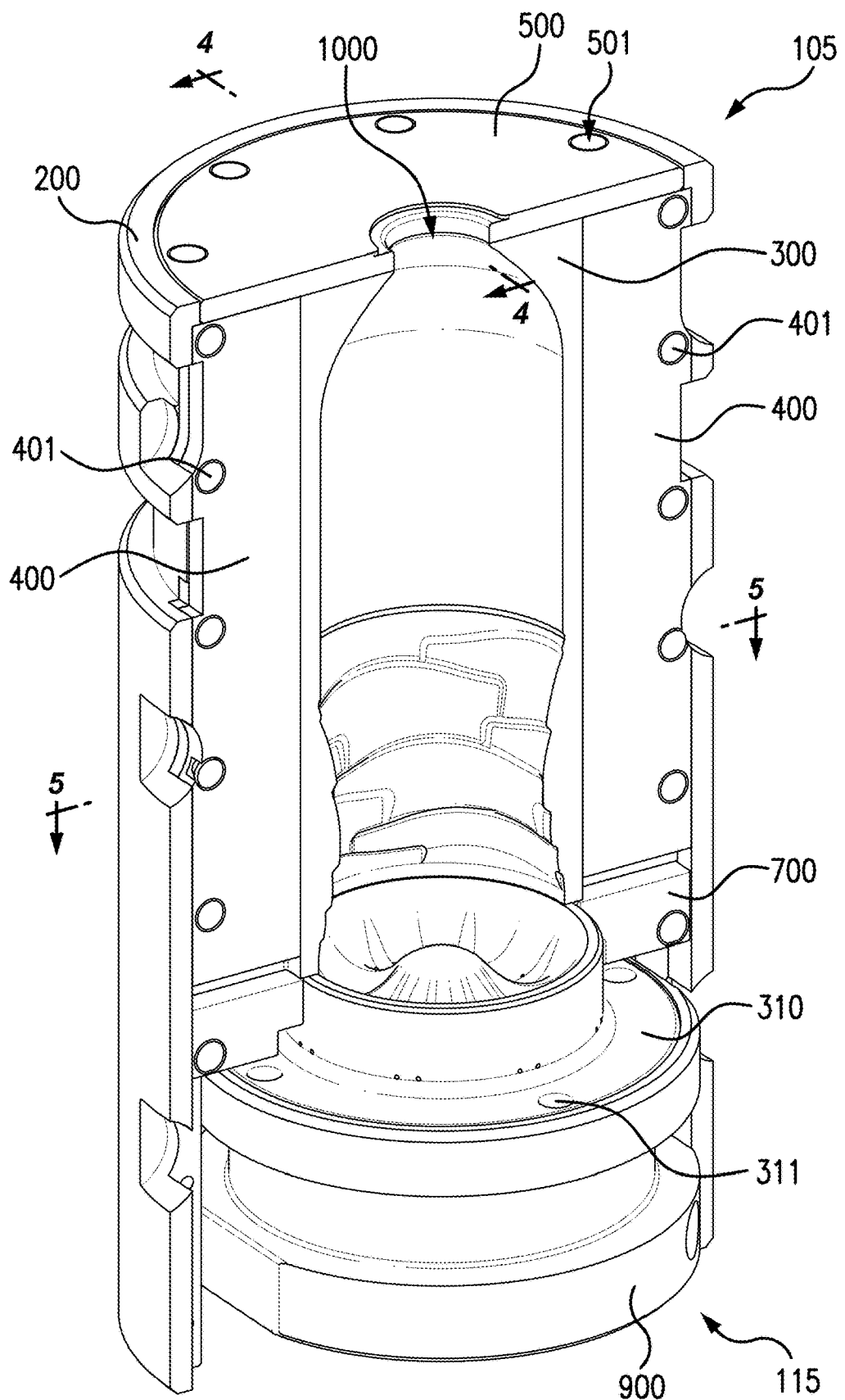
FIG. 1 shows a half of a modular blow mold system coupled to a base portion.

Some blow mold systems (e.g., shell mold, hot-fill mold, full-body mold, and small-cavity mold) use components generated using CAD (computer-aided design)/CAM (computer-aided manufacturing) systems. These systems may use laser engraving or etching for complex design features. These systems can be expensive and require a significant amount of time to manufacture after design. These systems may be used to make beverage containers using a blow mold process that involves placing a preform in a mold. The preform is heated, and then air is blown into the preform to blow the heated preform material to form a container matching the shape of the mold.

But developing a new container design can be an iterative process. This design process may involve creating multiple new molds as the design is conceived, developed, and refined. Accommodating this iterative process can be a long and expensive process for existing blow mold systems. And the time required to produce the next iteration can delay the production cycle such that multiple iterations may not be economically feasible. Accordingly, with existing blow mold systems, costs and time may prevent more than one or two molds from being produced before a full-scale production model is produced.

Although attempts have been made to use 3D printing in blow mold systems, these existing systems are suitable only for lab-scale processes, produce poor surface quality, and have low strength that results in a short life cycle—typically capable of producing only a few hundred bottles before failure. This low strength and poor surface quality makes these systems suitable only for small scale production at a very early stage for consumer or machine testing. And the existing 3D printing for blow mold systems uses additive technology and materials like acrylonitrile butadiene styrene ("ABS") for producing polymer-based components. But the additive technology used results in molds that produce containers with poor surface quality. Because of these issues, these 3D printed mold systems are not suitable for scaling up beyond lab-scale processes. Thus, existing 3D printed mold systems are generally suitable for low-quantity runs during early design testing.

Accordingly, there is a need for a 3D printed blow mold system that is cost-effective, improves surface quality of the resulting containers, can withstand high temperature and high pressure, and is durable enough to be used reliably for larger scale applications (e.g., pilot scale or full production scale). Further, there is a need for a system with these advantages that is also modular, interchangeable, and able to be integrated into existing production lines.

Using the blow mold systems according to embodiments disclosed herein, it is possible to produce a modular blow mold system that reduces tooling costs and minimizes lead time on each container design and each iteration of the design process. Further, the blow mold systems disclosed herein can be used in pilot scale and production scale processes. Further, embodiments disclosed herein include interchangeable molds so that portions of the blow mold system can be reused each time a new bottle design is used. These mold systems have improved strength, flexibility, and surface quality while also enabling repetitive prototyping for new bottle design.

The modularity of the disclosed systems also allows the systems (e.g., modular blow mold system 100) to accommodate a variety of bottle sizes and concepts to provide rapid switching of designs before a final design is locked in. Additionally, the mold systems disclosed herein are capable of producing bottles with a surface quality sufficient for pilot scale or even full production scale, which can have the capability to produce millions of bottles. And the same system (e.g., modular blow mold system 100) can be used across different platforms, from lab-scale all the way to full production scale.

All of these benefits can result in accelerated production times and blow mold systems that are much more flexible. For example, after a new container has been designed, a new mold may be ready for use within 1 to 2 weeks, compared to 4 to 5 weeks for existing systems. And costs to produce each mold may be reduced by as much as 80% to 90%.

As shown throughout the figures, modular blow mold system 100 may include first portion 105, second portion 110, and base 115. In some embodiments, first portion 105 and second portion 110 are mirror images of one another (possibly with differences within the mold cavity depending on the bottle design). Some embodiments disclosed herein are discussed with reference to first portion 105, but it is to be understood that all discussion of first portion 105 applies to second portion 110. For example, all components present in first portion 105 may have a corresponding component on second portion 110, and second portion 110 may have the same functionality as first portion 105.

FIG. 1 illustrates first portion 105 of modular blow mold system 100 coupled to base portion 900. First portion 105 may include outer shell 200, mold portion 300, retainer plates 400, top plate 500, cavity retainer 700, and locking ring 800 (see, e.g., FIG. 3). Second portion 110 may include corresponding parts (e.g., outer shell 210 and top plate 510 shown in FIG. 2 and a mold portion, retainer plates, a cavity retainer, and a locking ring). Base 115 may include base portion 900 and base mold portion 310.

Figure 2:
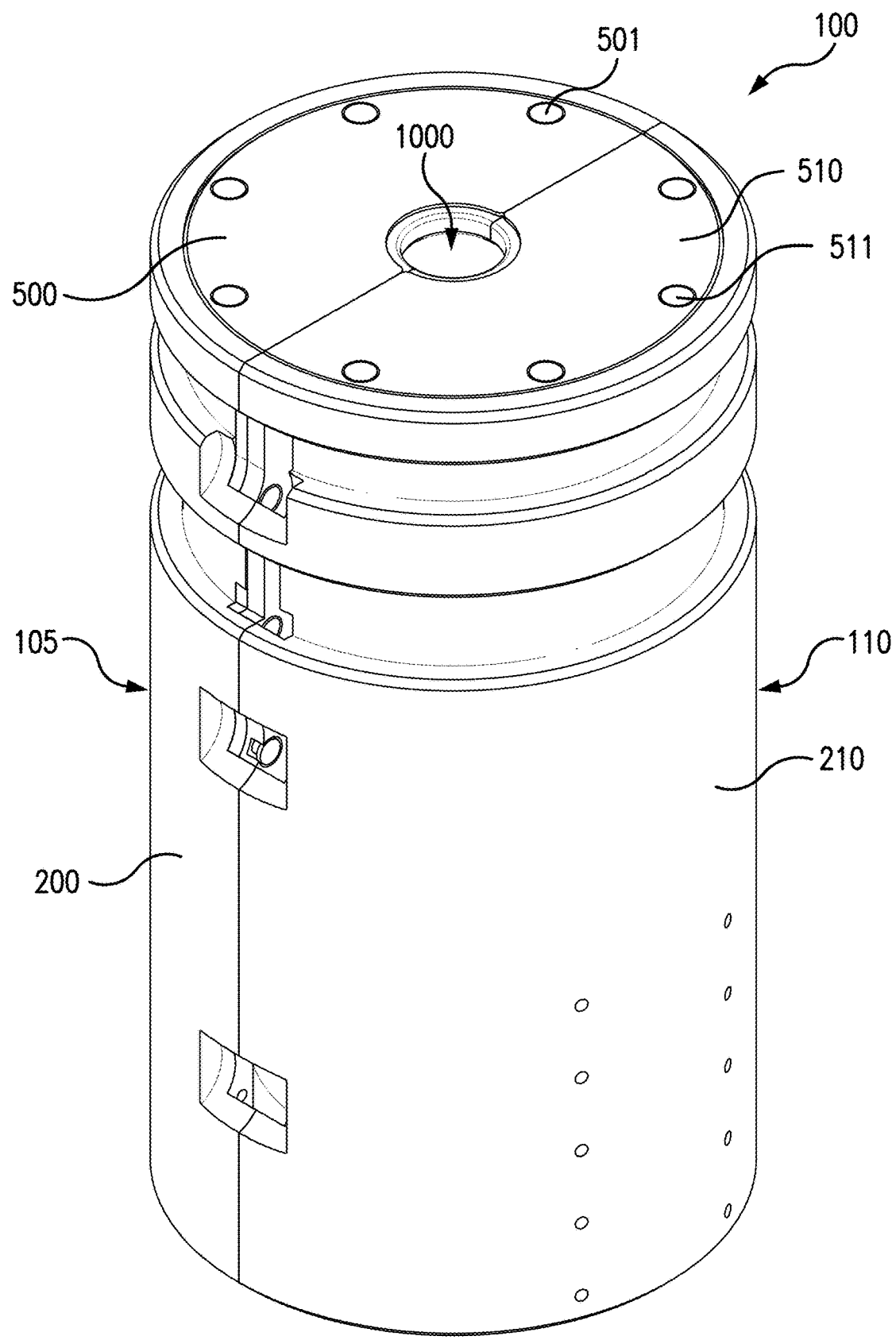
FIG. 2 shows the assembled modular blow mold system of FIG. 1.

FIG. 2 illustrates modular blow mold system 100 when first portion 105, second portion 110, and base 115 are assembled. When assembled, as shown in FIG. 2, mold portions (e.g., mold portion 300 and base mold portion 310) form an opening 1000 and a blow mold cavity inside of modular blow mold system 100. Opening 1000 may be sized to receive a preform (e.g., preform 1200, see FIG. 4). The blow mold cavity may correspond to the shape of the containers to be blow molded.

Figure 3:
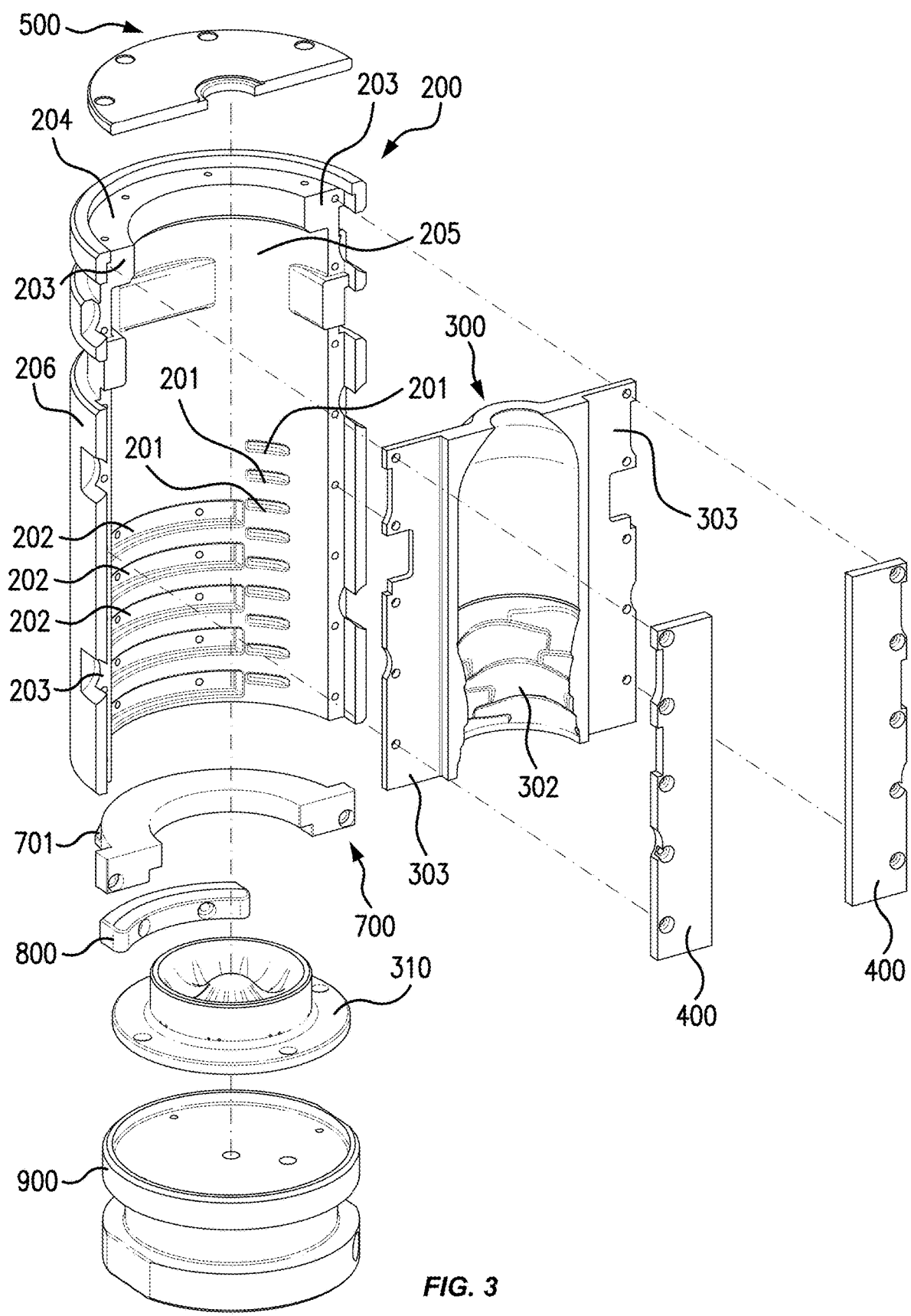
FIG. 3 shows an exploded view of the half of the modular system and base portion of FIG. 1.
Figure 4:
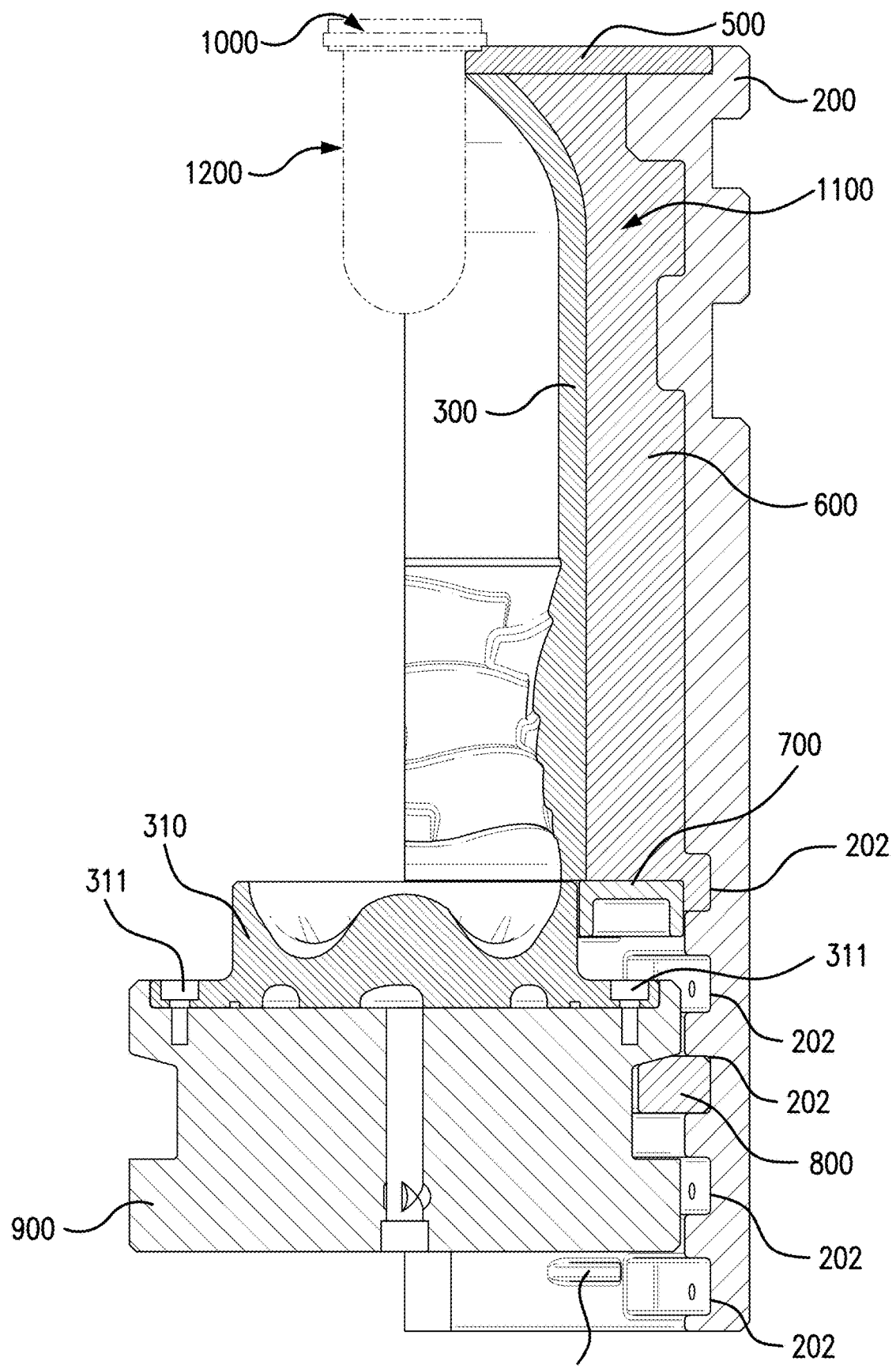
FIG. 4 shows a cross-sectional view of the half of the modular system of FIG. 1 with a filler material taken alone line 4-4 of FIG. 1.
Figure 5:
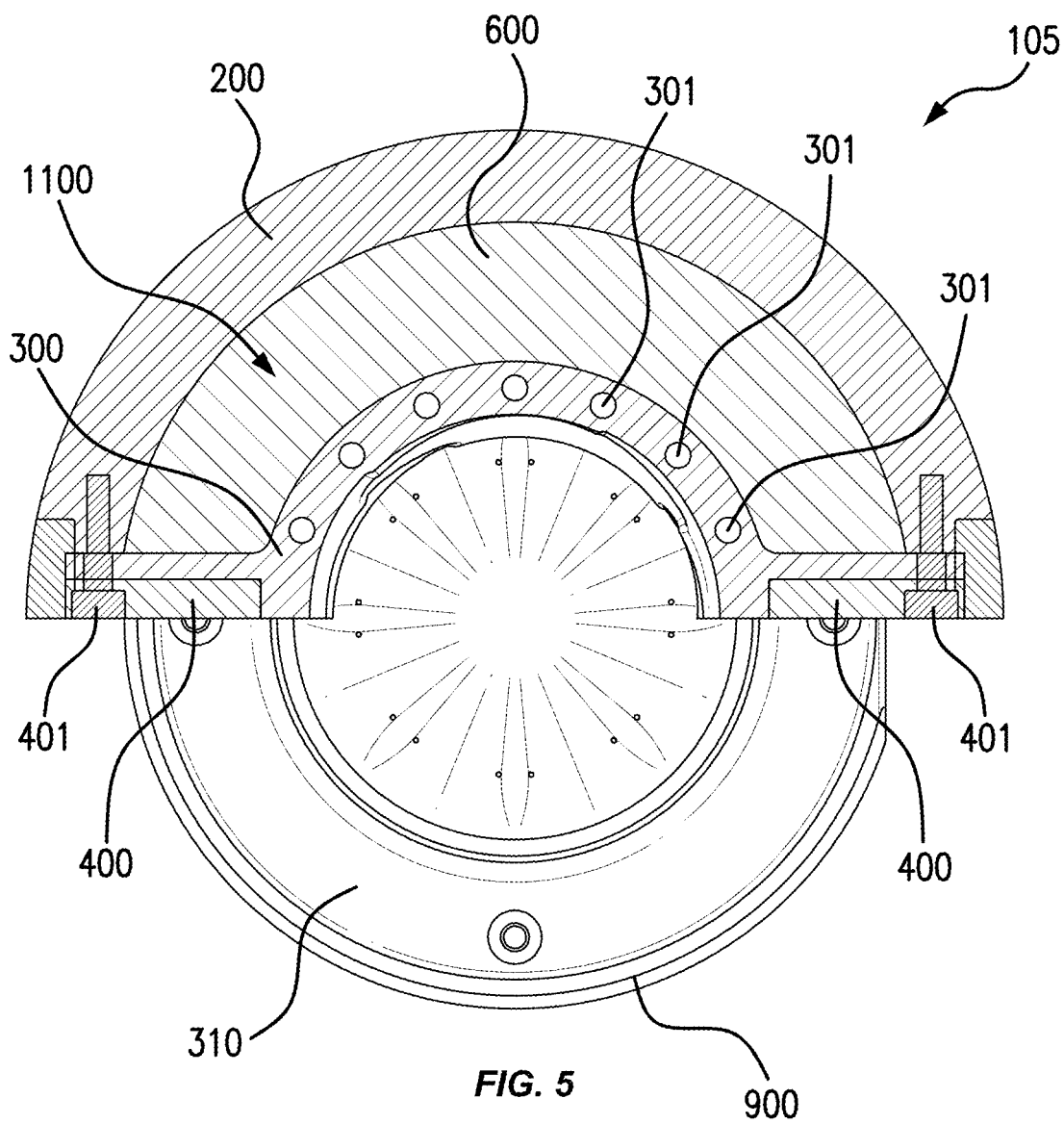
FIG. 5 shows a cross-sectional view of the half of the modular system of FIG. 1 taken along line 5-5 of FIG. 1.

FIG. 3 shows an exploded view of first portion 105 of modular blow mold system 100. Each of these components are discussed in detail below. FIG. 4 illustrates a cross-sectional view of first portion 105, base mold portion 310, and base portion 900, of modular blow mold system 100 taken along line 4-4 shown in FIG. 1. FIG. 5 illustrates a cross-sectional view of first portion 105, base mold portion 310, and base portion 900, of modular blow mold system 100 taken along line 5-5.

A benefit of the disclosed system is the versatility of the system. Modular blow mold systems disclosed herein (e.g., modular blow mold system 100) may be able to accommodate any variety of container shape or size but also be compatible with existing blow mold systems. For example, modular blow mold system 100, when assembled, may be the same size as traditional blow mold systems. Additionally, modular blow mold system 100 may be used at lab scale, pilot scale, or full production scale.

The modular systems (e.g., modular blow mold system 100) disclosed herein also improve flexibility. For example, certain components may be reused regardless of the shape or size of the container mold. For example, outer shells 200 and 210, retainer plates (e.g., retainer plates 400), top plates 500 and 510, locking rings (e.g., locking ring 800), and base portion 900 may be reusable components. These reusable components may be made of metal. In some embodiments, the reusable components are computer numerical control ("CNC") machined metal.

Other components, such as the mold portions (e.g., mold portion 300 and base mold portion 310) and the cavity retainers (e.g., cavity retainer 700) may be interchangeable. The interchangeable components may be compatible with the reusable components. For example, the mold portions (e.g., mold portion 300) and base mold portion 310 together may form a mold corresponding to a bottle shape. Any bottle shape may be made by simply replacing the mold portions (e.g., mold portion 300 and base mold portion 310) with different molds that are compatible with the reusable components. In some embodiments, the interchangeable components are 3D printed using a polymer. For example, the interchangeable components may be 3D printed using cyanate ester. In some embodiments, the interchangeable components are 3D printed using a metal. For example, the interchangeable components may be made of a 3D printed aluminum alloy, bronze alloy, or stainless steel. The 3D printed components may be fully isotropic. Unlike layered 3D printing methods, which can cause a point of failure at each layer, fully isotropic components may increase strength and surface quality. As used herein, "isotropic" refers to a material in which the mechanical and thermal properties are the same in all material directions (e.g., elastic modulus, compressive strength). After 3D printing, the interchangeable components may be further processed. In some embodiments, the interchangeable components are washed and cured in a temperature controlled chamber.

Outer shell 200 may have a mold contacting surface 203, a top plate contacting surface 204, an inner surface 205, and an outer surface 206. Outer shell 200 may also have recesses 201 and recesses 202.

Mold portion 300 may include container mold 302 and flanges 303. Flanges 303 may contact with mold contacting surface 203 on outer shell 200. Screws may be used to secure mold portion 300 to outer shell 200 where flanges 303 and mold contacting surface 203 meet. When mold portion 300 is coupled to outer shell 200, a space is formed between inner surface 205 and container mold 302. Container mold 302 may be a container-specific shape, and may be redesigned as needed to accommodate different container designs and sizes. The shape and size of the portions of flanges 303 that contact mold contacting surface 203 may remain the same even as container mold 302 is adjusted in size and shape. This allows mold portion 300 to easily engage with outer shell 200. In some embodiments, retainer plates 400 and top plate 500 are used to secure mold portion 300 to outer shell 200. For example, retainer plates 400 may be placed over flanges 303, and screws may be used to secure outer shell 200, mold portion 300, and retainer plates 400 together. Then top plate may be secured using screws 501.

Top plate 500 may be shaped to seat at top plate contacting surface 204 of outer shell 200. Top plate 500 may be coupled to outer shell 200 using screws. Outer shell 200, mold portion 300, and top plate 500 together form volume 1100 (see, e.g., FIGS. 4 and 5). In some embodiments, volume 1100 remains empty during use. In some embodiments, a filler is used to fill volume 1100. For example, the filler may be filler material 600, discussed in more detail below.

Cavity retainer 700 may be positioned to enclose volume 1100 (and secure filler material 600 within volume 1100 in embodiments where filler material 600 is used). For example, cavity retainer 700 may be coupled to outer shell 200. In some embodiments, cavity retainer 700 includes flanges 701 that mate with corresponding recesses 201. Locking ring 800 may be coupled to outer shell 200. When coupled, locking ring 800 engages with one of recesses 202 and provides a way to couple base mold portion 310 and base portion 900 to the first portion 105. Cavity retainer 700 and locking ring 800 may be moved up or down to accommodate molds for containers with different heights. For example, for shorter containers, cavity retainer 700 and locking ring 800 may couple using topmost recesses 201 and 202, respectively.

In some embodiments, second portion 110 has the same parts as first portion 105. In some embodiments, all of the component parts of second portion 110 are mirror images of the corresponding part of first portion 105. For example, second portion 110 may include outer shell 210 and top plate 510 and a mold portion, retainer plates, a filler material, a cavity retainer, and a locking ring that are mirror images of outer shell 200, mold portion 300, retainer plates 400, top plate 500, filler material 600, cavity retainer 700, and locking ring 800, respectively. In some embodiments, second portion 110 is a mirror image of first portions 110 except for differences within the mold cavity depending on the bottle design. Second portion 110 may couple to first portion 105 and base 115.

Base 115 of modular blow mold system 100 may include base portion 900 and base mold portion 310. Base mold portion 310 may be a mold corresponding to the base of a container. Base mold portion 310 may be interchangeable based on the desired container base shape. Base mold portion 310 may couple to base portion 900 using pins (e.g., pins 311) to form base 115. Base 115 may be coupled to first portion 105 and second portion 110 to form modular blow mold system 100. When first portion 105, second portion 110, and base 115 are coupled, the mold portions (e.g., mold portions 300 and base mold portion 310) form a blow mold cavity that corresponds to the shape of a container.

Blow mold system 100 may include opening 1000. In some embodiments, opening 1000 is configured to receive a preform for a container (e.g., preform 1200), as illustrated in FIG. 4. The preform may be a standard preform for making a blow mold container. The preform may be made of any variety of blow moldable plastic (e.g., PET).

Mold portions (e.g., mold portion 300 and base mold portion 310) and cavity retainers (e.g., cavity retainer 700) may be made of any suitable 3D printed material. To improve stability and thermal properties of the mold, the 3D printed materials may have a high elastic modulus and high heat deflection temperatures while also providing a surface that is smooth and durable enough to provide consistent high-quality container surfaces. The mold portions (e.g., mold portions 300 and base mold portion 310) may be made of material having a tensile strength of at least 50 MPa (e.g., at least 75 MPa or at least 90 MPa), an elastic modulus of at least 2500 MPa (e.g., at least 3000 MPa or at least 3500 MPa), and a heat deflection temperature of at least 200° C. (e.g., at least 225° C. or at least 250° C.). In some embodiments, the 3D printed material is cyanate ester. In some embodiments, the 3D printed material is a metal. In some embodiments, the mold portions (e.g., mold portions 300 and base mold portion 310) and cavity retainers (e.g., cavity retainer 700) are made of the same material. In some embodiments, the mold portions (e.g., mold portions 300) are made of a different material than base mold portion 310. For example, the 3D printed material may be a polymer or a metal. In some embodiments, the 3D printed material is cyanate ester.

Filler material 600 may further increase the strength of modular blow mold system 100. During the blow molding process, the molds are subjected to pressure from within the blow mold cavity. Existing systems used molds made of metal (e.g., steel) that can withstand pressure changes or 3D printed molds that were prone to deflect or compress during blow molding, which reduced the overall life and quality of the molds. Embodiments disclosed herein use strong 3D printed material (e.g., isotropic materials discussed above) to withstand the pressure. A filler material (e.g., filler material 600) may further improve the strength of the molds because the filler material is relatively incompressible and helps the mold support the internal pressures without deflecting.

In some embodiments, filler material 600 also improves the thermal properties of modular blow mold system 100. Filler material 600 may be a pourable plaster that is poured into volume 1100. Filler material may have a high elastic modulus and high compressive strength. After pouring, filler material 600 may solidify. In some embodiments, filler material 600 is a plaster having a density of between 900 kg/m$^3$ and 1500 kg/m$^3$. In some embodiments, filler material 600 is a plaster having a density of about 1200 kg/m$^3$. Filler material 600 may have an elastic modulus. In some embodiments, filler material 600 may have an elastic modulus of at least 5600 MPa (e.g., at least 6300 MPa, at least 7000 MPa). In some embodiments, filler material 600 has an elastic modulus of between 5600 MPA and 8400 MPa (e.g., between 6300 MPa and 7700 MPa). In some embodiments, filler material 600 has an elastic modulus of about 7000 MPa.

Regulating temperature and may be beneficial during blow molding because operating conditions may involve elevated temperatures. For example, in some embodiments, the temperature of the mold portions (e.g., mold portions 300 or base mold portion 310) may be regulated by including optional internal cooling channels to improve cooling efficiency. In some embodiments, each mold portion (e.g., mold portion 300) includes at least one cooling channel (e.g., channels 301). In some embodiments mold portions (e.g., mold portion 300) includes at least three cooling channels (e.g., cooling channels 301) that are configured to receive a cooling fluid. In some embodiments, cooling channels (e.g., channels 301) are vertically oriented conformal cooling channels, as shown by the cross-section shown in FIG. 5. In use, a gas or a liquid may be flowed through the cooling channels to improve cooling of the mold portions (e.g., mold portion 300). In some embodiments, a coolant is flowed through the cooling channels. In some embodiments, flowing a coolant through the cooling channels improves the productivity of blow mold system 100.

Modular blow mold systems disclosed herein (e.g., modular blow mold system 100) may be durable enough to be used at pilot scale and have a life cycle of at least 5000 containers (e.g., at least 7500 containers, at least 10,000 containers, at least 15,000 containers). In some embodiment modular blow mold system 100 is durable enough to be used at production scale and have a life cycle of at least 100,000 containers (e.g., at least 250,000 containers, at least 500,000 containers, at least 1,000,000 containers, or at least 2,000,000 containers).

Figure 6:
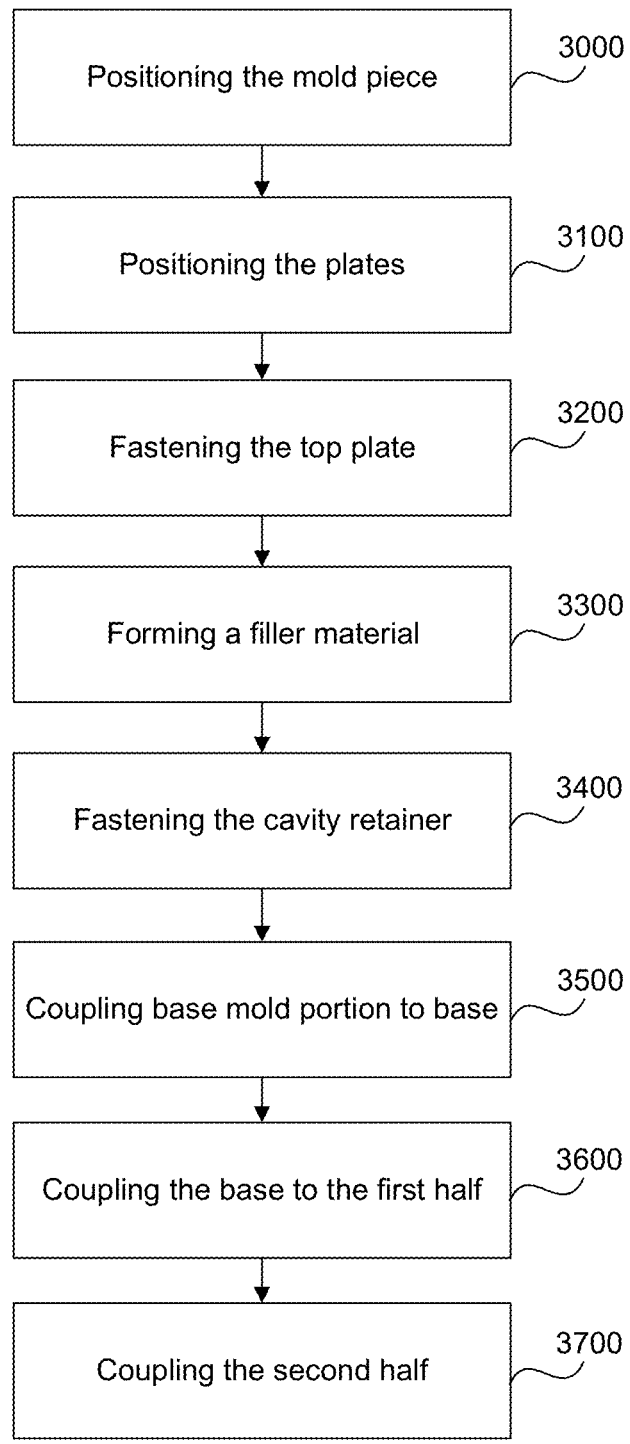
FIG. 6 shows a flow chart illustrating methods of assembling the modular blow mold system of FIGS. 1-5.
Figure 7:
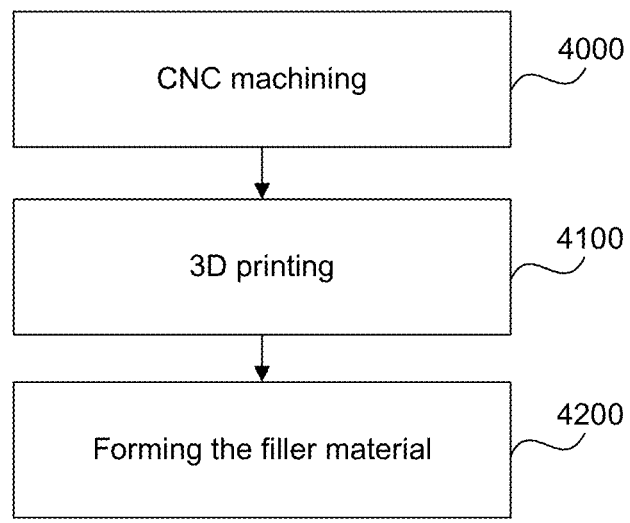
FIG. 7 shows a flow chart illustrating methods of making the modular blow mold system of FIGS. 1-5.

Modular blow mold system 100 may be readily assembled and disassembled. The steps of assembling blow mold system 100 are illustrated by the flow chart in FIG. 6. First portion 105 may be assembled at step 3000 through 3400. At step 3000, mold portion 300 is positioned so that flanges 303 of mold portion 300 align with mold contacting surfaces 203 of outer shell 200. Then at step 3100, retainer plates 400 are positioned over flanges 303 of mold portion 300. Screws may be used to couple the outer shell 200, mold portion 300, and retainer plates 400. At step 3200, top plate 500 is then fastened to outer shell 200 using screws at top plate contacting surface 204. Locking ring 800 is then coupled to outer shell 200 at one of the recesses 202. The position of locking ring 800 may be adjusted depending on the height of the container to be blow molded. If a filler material is used, the filler may be made at optional step 3300. A method for making filler material 600 is discussed in detail below at step 4200. In some embodiments, a filler material is not used. At step 3400, cavity retainer 700 is coupled to outer shell 200 at recesses 202. Steps 3000 through 3400 may be repeated to assemble second portion 110.

At step 3500, base mold portion 310 may be coupled to base portion 900 to form base 115. Then at step 3600, base 115 is coupled first portion 105 by locking ring 800. After base portion 900 is coupled to first portion 105 second portion 110 may be coupled to first portion 105 to form an assembled modular blow mold system 100 at step 3700. Once first portion 105 and second portion 110 are coupled, the modular blow mold system 100 forms a blow mold cavity defined by each of the mold portions (e.g., mold portions 300 and base mold portion 310).

The components of modular blow mold system may be made using various methods. For example, at step 4000 the reusable components may be made of metal using CNC machining. The reusable components may include outer shells 200 and 210, pairs of cavity retainer plates (e.g., retainer plates 400), top plates 500 and 510, locking rings (e.g., locking ring 800), and base portion 900. At step 4100, the interchangeable components (e.g., mold portions, 300, base mold portion 310, and cavity retainers 700) may be made using 3D printing methods. In some embodiments, the interchangeable components are made of a polymer (e.g., cyanate ester). In some embodiments, the interchangeable components are made of a metal. For example, the interchangeable components may be made of a 3D printed aluminum alloy, a bronze alloy, or stainless steel.

At step 4200, the filler material 600 may be formed. Forming filler material 600 may include first coupling outer shell 200, mold portion 300, retainer plates 400, and top plate 500, as discussed in steps 3000 to 3300 above. Once those pieces are assembled, the assembled pieces may be inverted so that top plate 500 is oriented down. Liquid filler material 600 may then be poured into volume 1100 defined by outer shell 200, mold portion 300, and top plate 500. In some embodiments liquid filler material 600 is poured until volume 1100 is filled. After volume 1100 is filled, liquid filler material 600 may be allowed to form a solid (e.g., to cure). For example, the filler material may be allowed to cool naturally (e.g., in room-temperature conditions) during which it will naturally cure by transitioning into solid form. In some embodiments, the curing may take place in a temperature controlled chamber (e.g., an oven). In some embodiments, filler material 600 is a liquid plaster that transitions to (e.g., is cured to form) a solid (e.g., cured) plaster. In some embodiments, the filler material is not cured at elevated temperatures but is allowed to cool at room temperature.

As used herein, the terms "top," "inner," "outer," and the like are intended to assist in understanding of embodiments of the disclosure with reference to the accompanying drawings with respect to the orientation of the beverage closure as shown, and are not intended to be limiting to the scope of the disclosure or to limit the disclosure scope to the embodiments depicted in the Figures. The directional terms are used for convenience of description and it is understood that a closure and a container may be positioned in any of various orientations.

As used herein, the term "3D printing" refers to a method of creating a physical object using a digital model by joining or solidifying the printed material into the shape of the physical object.

As used herein, when the term "about" is used in describing a value or an end-point of a range, the disclosure should be understood to include the specific value or end-point referred to. Whether or not a numerical value or end-point of a range recites "about," the numerical value or end-point is intended to include two embodiments: one modified by "about," and one not modified by "about." As used herein, the term "about" may include ±10%.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The breadth and scope of the present disclosure should not be limited by any of the above-described exemplary embodiments, but should be defined only in accordance with the following claims and their equivalents.

What is claimed is:

1. A modular system for blow molding a container, the system comprising:
   a first portion comprising:
      a first shell;
      a first mold removably coupled to the first shell;
      a first top plate removably coupled to the first shell; and
      a first filler material disposed in a volume defined by the first shell, the first mold, and the first top plate;
   a second portion removably coupled to the first portion, the second portion comprising:
      a second shell;
      a second mold removably coupled to the second shell;
      a second top plate removably coupled to the second shell; and
      a second filler material disposed in a volume defined by the second shell, the second mold, and the second top plate;
   a third portion comprising a base and a base mold, wherein the base is removably coupled to the first shell and the second shell,
   wherein the first mold, the second mold, and the base mold together define a blow mold cavity when the first portion is coupled to the second portion.

2. The system of claim 1, further comprising a first cavity retainer removably coupled to the first shell, and a second cavity retainer removably coupled to the second shell.

3. The system of claim 2, wherein each of the first mold, the second mold, and the base mold is 3D printed.

4. The system of claim 3, wherein the first shell, the first top plate, the second shell, and the second top plate are made of CNC machined metal.

5. The system of claim 3, wherein each of the first mold, the second mold, and the base mold is isotropic.

6. The system of claim 1, wherein each of the first and second filler material has an elastic modulus of at least 6300 MPa.

7. The system of claim 1, wherein the first mold, the second mold, and the base mold are made of a polymer comprising cyanate ester.

8. The system of claim 1, further comprising at least one cooling channel within each of the first mold and the second mold.

9. The system of claim 1, further comprising:
a locking ring removably coupled to the first shell,
wherein the base is configured to releasably engage with the locking ring to secure the third portion.

10. The system of claim 9, further comprising a plurality of vertically aligned recesses configured to receive the locking ring such that the vertical position of the third portion may be adjusted.

11. An interchangeable mold for blow molding a container, the mold comprising:
a first 3D printed mold portion;
a second 3D printed mold portion; and
a 3D printed base mold portion,
wherein the first 3D printed mold portion, the second 3D printed mold portion, and the 3D printed base mold portion are configured to together define a blow mold cavity,
wherein the first 3D printed mold portion, the second 3D printed mold portion, and the 3D printed base mold portion are isotropic, and
wherein the first 3D printed mold portion is configured to engage with a first shell, the second 3D printed mold portion is configured to engage with a second shell, and the 3D printed base mold portion is configured to engage with the first shell and the second shell,
wherein the first shell and the second shell are each compatible with a blow mold system to form blow-molded containers within the blow mold cavity.

12. The mold of claim 11, wherein the first 3D printed mold portion, the second 3D printed mold portion, and the 3D printed base mold portion are made of a polymer comprising cyanate ester.

13. The mold of claim 11, further comprising:
a first filler portion having a first side in contact with a back of the first 3D printed mold portion and a second side configured to contact an interior side of the shell; and
a second filler portion having a first side in contact with a back of the second 3D printed mold portion and a second side configured to contact the interior side of the shell.

14. The mold of claim 13, wherein the first filler material and the second filler material are both a plaster.

15. The mold of claim 13, further comprising a first cavity retainer and a second cavity retainer for securing the first filler portion and the second filler portion, respectively.

16. The mold of claim 11, wherein the first 3D printed mold portion and the second 3D printed mold portion each comprise cooling channels.

17. A method of making a modular blow mold system, the method comprising:
3D printing a first mold portion, a second mold portion, and a base portion;
coupling the first mold portion to a first shell to form a first half, the first half comprising a first volume defined by the first mold portion and the first shell;
coupling the second mold portion to a second shell to form a second half, the second half comprising a second volume defined by the second mold portion and the second shell;
pouring a filler material in the first volume;
pouring the filler material in the second volume; and
cooling the filler material to form a solid filler.

18. The method of claim 17, wherein the first mold portion, the second mold portion, and the base portion are made of a polymer comprising cyanate ester.

19. The method of claim 17, wherein the filler material comprises a plaster.

20. The method of claim 19, wherein the plaster is a liquid before the cooling.

21. The method of claim 17, wherein the cooling comprises cooling the filler material at room temperature.

22. The method of claim 17, wherein the 3D printing step comprises forming at least one channel in the first mold portion and the second mold portion.

23. The method of claim 17, further comprising coupling the first half and the second half to form a blow mold comprising a blow mold cavity defined by the first mold portion and the second mold portion.

* * * * *